(12) United States Patent
Hillan et al.

(10) Patent No.: US 9,351,144 B2
(45) Date of Patent: May 24, 2016

(54) METHODS AND APPARATUS FOR IMPROVING NFC RF DISCOVERY BASED ON DETECTION OF OTHER RF ACTIVITY

(75) Inventors: John Hillan, Farnborough (GB); Joel Benjamin Linsky, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 448 days.

(21) Appl. No.: 13/487,552

(22) Filed: Jun. 4, 2012

(65) Prior Publication Data
US 2013/0324036 A1    Dec. 5, 2013

(51) Int. Cl.
*H04B 7/00*    (2006.01)
*H04W 8/00*    (2009.01)

(52) U.S. Cl.
CPC .................................... *H04W 8/005* (2013.01)

(58) Field of Classification Search
CPC G06K 19/0723; G06K 7/0008; H04W 84/18; H04W 52/02; H04W 52/0229; H04M 1/7253
USPC ............ 455/9, 41.1, 41.2, 41.3, 67.11, 67.15, 455/67.7, 515, 574, 343.1–343.6
See application file for complete search history.

(56) References Cited

U.S. PATENT DOCUMENTS

| 7,493,082 | B2* | 2/2009 | Perttila | H04M 1/7253 340/10.1 |
| 7,680,520 | B2* | 3/2010 | Ruuska | H04W 52/0216 370/311 |
| 7,882,541 | B2* | 2/2011 | Yasaki | G06F 21/35 713/168 |
| 8,224,243 | B2* | 7/2012 | Takayama | G06K 7/10237 455/41.1 |
| 8,428,518 | B2* | 4/2013 | Cordeiro | H04W 72/1231 342/145 |
| 2008/0069033 | A1* | 3/2008 | Li | H04W 48/16 370/328 |
| 2008/0224825 | A1 | 9/2008 | Nystrom et al. | |
| 2010/0026454 | A1 | 2/2010 | Rowse et al. | |
| 2010/0144269 | A1 | 6/2010 | Do et al. | |
| 2010/0165921 | A1* | 7/2010 | Maheshwari | H04W 36/0061 370/328 |
| 2010/0178866 | A1* | 7/2010 | Jalkanen | G06K 7/0008 455/41.1 |
| 2010/0254308 | A1* | 10/2010 | Laroia | H04W 8/005 370/328 |
| 2010/0309831 | A1* | 12/2010 | Yeh | H04W 52/0216 370/311 |
| 2011/0153773 | A1* | 6/2011 | Vandwalle | H04W 8/005 709/217 |
| 2011/0161697 | A1* | 6/2011 | Qi | G06F 1/3209 713/320 |
| 2011/0256871 | A1* | 10/2011 | Cooper | H04L 1/1877 455/436 |
| 2011/0274021 | A1 | 11/2011 | He et al. | |
| 2011/0313922 | A1* | 12/2011 | Ben Ayed | B06Q 20/108 705/42 |
| 2012/0045989 | A1* | 2/2012 | Suumaki | H04W 8/005 455/41.1 |
| 2012/0077434 | A1 | 3/2012 | Royston | |

(Continued)

OTHER PUBLICATIONS

International Search Report and Written Opinion—PCT/US2013/044062—ISA/EPO—Sep. 4, 2013.

*Primary Examiner* — Edward Urban
*Assistant Examiner* — Rui Hu
(74) *Attorney, Agent, or Firm* — Jia J. Wu

(57) ABSTRACT

Aspects disclosed herein relate to improving NFC RF discovery through monitoring RF activity associated with one or more RATs. In one example, a first NFC device may be configured to use both a first RAT and NFC. The first NFC device may monitor RF activity on a first RAT to determine whether there is at least a greater probability that a second NFC device is within a threshold. The NFC device may be also configured to modify at least an interval between polling modes in a NFC RF discovery loop based on the determination.

41 Claims, 8 Drawing Sheets

(56) References Cited

U.S. PATENT DOCUMENTS

| | | | |
|---|---|---|---|
| 2012/0309302 A1* | 12/2012 | Buhot | H04B 5/00 455/41.1 |
| 2013/0079026 A1* | 3/2013 | Hagedorn | H04W 4/008 455/456.1 |
| 2013/0084803 A1* | 4/2013 | Hall | H04W 52/0277 455/41.1 |
| 2013/0132501 A1* | 5/2013 | Vandwalle | H04L 67/104 709/208 |
| 2013/0143487 A1* | 6/2013 | Hillan | G06K 7/10009 455/41.1 |
| 2013/0150086 A1* | 6/2013 | Caralis | G06Q 30/0631 455/456.3 |
| 2013/0203347 A1* | 8/2013 | Moosavi | H04W 52/0254 455/41.1 |
| 2014/0126417 A1* | 5/2014 | Kang | H04W 8/005 370/254 |
| 2014/0226639 A1* | 8/2014 | Yi | H04W 74/04 370/336 |

\* cited by examiner

METHODS AND APPARATUS FOR IMPROVING NFC RF DISCOVERY BASED ON DETECTION OF OTHER RF ACTIVITY

BACKGROUND

1. Field

The disclosed aspects relate generally to communications between and/or within devices and specifically to methods and systems for improving near field communication (NFC) radio frequency (RF) discovery through monitoring RF activity associated with one or more radio access technologies (RATs).

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, NFC, etc.

Generally, NFC is perceived as a "touch to do" technology that allows users to perform tasks just by bringing them together. When deployed in handheld devices, NFC faces a conflict between the desire to be able to interact with tags, reader/writers, and other devices in a simple and intuitive manner, versus the need to avoid excessive impact on the average battery drain. An implementation thus faces a trade-off between responsiveness and power consumption. The more time a device spends looking for other NFC devices, the faster they will connect, but the higher the drain on the battery. As such current designs attempt to define a correct amount of time spent polling and listening to give a good user experience without adding significantly to the average standby current. In order for a device to make the best compromise in a given situation, it is beneficial if it is made aware of the probability of finding another NFC device.

Thus, improved apparatuses and methods for managing the polling & listening times based on other detected RF activity may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

Various aspects are described in connection with improving NFC RF discovery through monitoring RF activity associated with one or more RATs. In one example, a first NFC device may be configured to use both a first RAT and NFC. The first NFC device may monitor RF activity on a first RAT to determine whether there is at least a greater probability that a second NFC device is within a threshold. The NFC device may be also configured to modify at least an interval between polling modes in a NFC RF discovery loop based on the determination.

According to related aspects, a method for provides a mechanism for improving NFC RF discovery through monitoring RF activity associated with one or more RATs. The method can include monitoring RF activity on a first RAT used by a first NFC device. In an aspect, the first RAT may be different than a NFC RF technology used by the first NFC device. Further, the method can include determining at least a greater probability that a second NFC device is within a threshold range based on the monitored RF activity of the first RAT. The method can also include modifying at least an interval between polling modes in a NFC RF discovery loop based on the determination.

Another aspect relates to a communications apparatus. The communications apparatus can include means for monitoring RF activity on a first RAT used by a first NFC device. In an aspect, the first RAT may be different than a NFC RF technology used by the first NFC device. Further, the communications apparatus can include means for determining at least a greater probability that a second NFC device is within a threshold range based on the monitored RF activity of the first RAT. The communications apparatus can also include means for modifying at least an interval between polling modes in a NFC RF discovery loop based on the determination.

Another aspect relates to a communications apparatus. The apparatus can include an RF activity module configured to monitor RF activity on a first RAT used by a first NFC device. In an aspect, the first RAT may be different than a NFC RF technology used by the first NFC device. The RF activity module may also be configured to determine at least a greater probability that a second NFC device is within a threshold range based on the monitored RF activity of the first RAT. The RF activity module may be further configured to modify at least an interval between polling modes in a NFC RF discovery loop based on the determination.

Another aspect relates to a computer program product, which can have a computer-readable medium comprising code for monitoring RF activity on a first RAT used by a first NFC device. In an aspect, the first RAT may be different than a NFC RF technology used by the first NFC device. The computer-readable medium can include code for determining at least a greater probability that a second NFC device is within a threshold range based on the monitored RF activity of the first RAT. The computer-readable medium can also include code for modifying at least an interval between polling modes in a NFC RF discovery loop based on the determination.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Generally, near field communication (NFC) is perceived as a "touch to do" technology that allows users to perform tasks just by bringing an NFC device together with a tag, peer, reader, etc. When NFC is deployed in handheld devices, it faces a conflict between being able to interact with tags, reader/writers, and other devices in a simple and intuitive manner, versus avoiding excessive impact on the average battery drain. The more time a device spends looking for other NFC devices, the faster they will connect, but the higher the drain on the battery. In order for a device to make the best compromise in a given situation, it is beneficial if it is made aware of the probability of finding another NFC device. When a module that controls the operation of the NFC communications is informed that another NFC device is close by, the NFC device may increase NFC activity so that the devices can find each other more quickly.

Based on a determination that the probability has risen of impending NFC use, the NFC enabled device may retune NFC RF Discovery to increase the amount of time spent polling and/or listening. Accordingly, when the devices reach a distance at which NFC communication is possible, the devices are potentially more likely to find each other more quickly, resulting in an improved user experience. Conversely, if there is a decreasing amount of RF activity associated with one or more of the PAN RATs, the probability is higher that the NFC enabled devices may be separated, and thus the device could retune NFC RF Discovery to reduce polling and/or listening in order to reduce current/power consumption.

Figure 1:
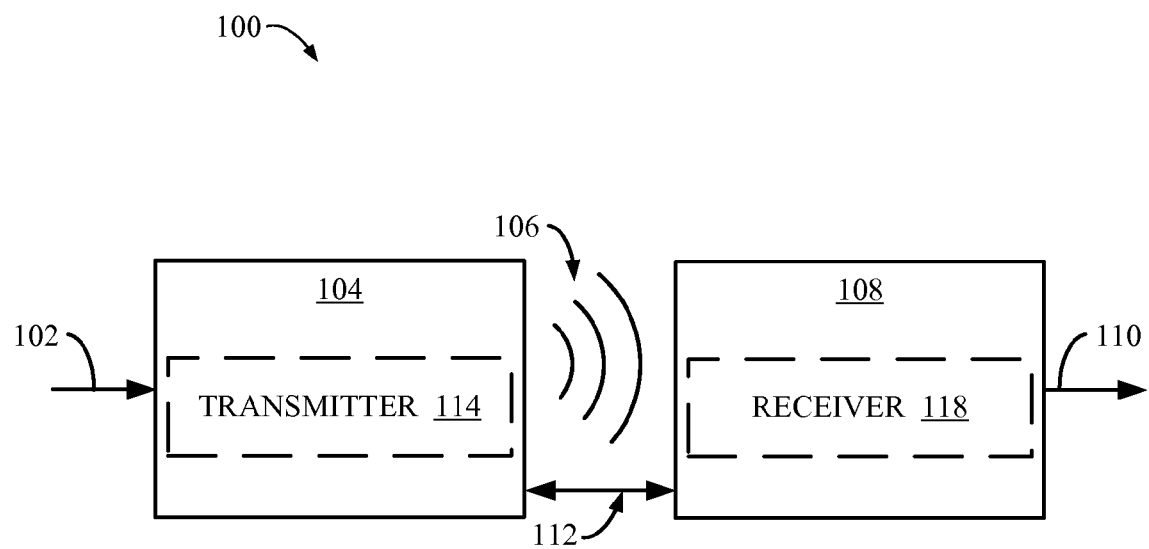
FIG. 1 is a block diagram of a wireless communication system, according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In an exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
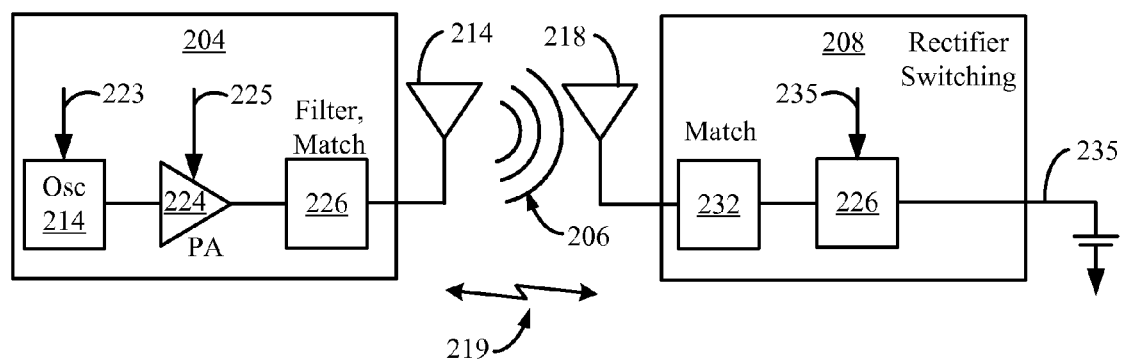
FIG. 2 is a schematic diagram of a wireless communication system, according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, zigbee, cellular, etc).

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 119 (e.g., Bluetooth, zigbee, cellular, etc).

Figure 3:
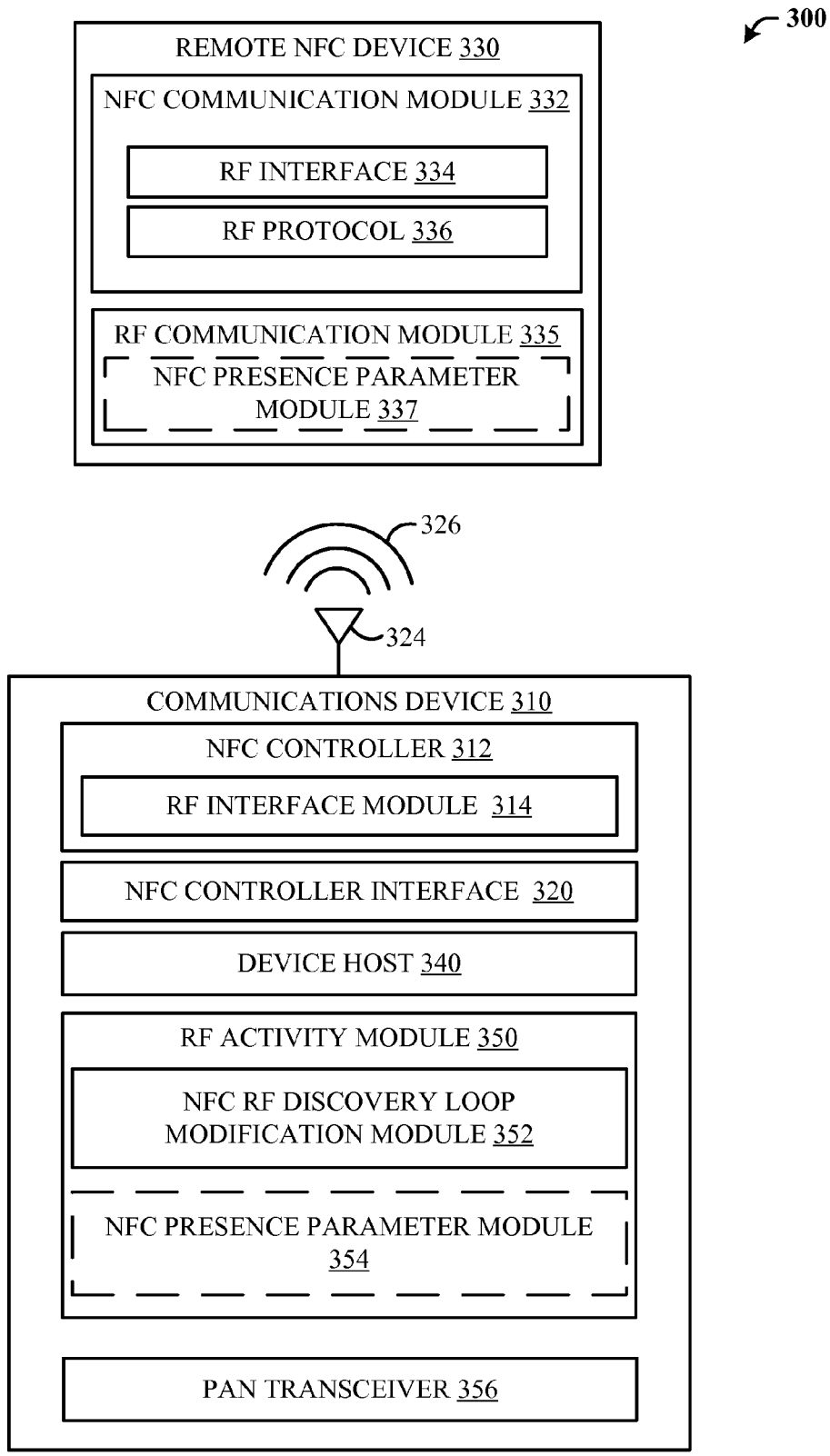
FIG. 3 is a block diagram of a NFC environment, according to an aspect.

With reference to FIG. 3, a block diagram of a communication network 300 according to an aspect is illustrated. Communication network 300 may include communications devices 310 which, through antenna 324, may be in communication with a remote NFC device 330 using one or more NFC technologies 326 (e.g., NFC-A, NFC-B, NFC-F, etc.). In an aspect, remote NFC device 330 and/or communications device 310 may be operable to communicate through NFC communication module 332 through one or more RF interfaces 334 using one or more RF protocols 336. In another aspect, communications device 310 may be operable to be connected to an access network and/or core network (e.g., a CDMA network, a GPRS network, a UMTS network, and other types of wireline and wireless communication networks). Further, remote NFC device 330 may include RF communication module 335 that allows remote NFC device to use a RF technology, such as but not limited to, FlashLinQ, WiMedia, Bluetooth, ZigBee, Wi-Fi based on the IEEE 802.11 standard, etc. Communications device 310 may include a transceiver 356, such as but not limited to a personal area network (PAN) transceiver 356 that may be operable to monitor RF activity associated with RF communication module 335. In an optional aspect, RF communication module 335 may include a NFC presence parameter module 337 that is operable to include a parameter a signal communicated using the RF technology (e.g., Bluetooth LE). In other words, NFC presence parameter module 337 may use the first RAT communicated by RF communication module 335 to advertize co-located support for NFC. In such an aspect, PAN transceiver 356 may be operable to receive and decode the parameter communicated by RF communication module 335. In another aspect, remote NFC device 330 may include but is not limited to a remote NFC tag, a reader/writer device, a peer initiator device, a remote peer target device, a card emulator, etc.

Communications device 310 may include NCI 320. In an aspect, NCI 320 may be operable to enable communications between a device host 340 and NFC controller 312.

Communications device 310 may include a NFC controller (NFCC) 312. In an aspect, NFCC 312 may include RF interface module 314. RF interface module 314 may be operable to enable NFC based communications. DH 340 may be operable to generate a command to prompt NFCC 312 to perform various functions associated with enabling NFC based communications.

Communications device 310 may include RF activity module 350. RF activity module 350 may include NFC RF discovery loop modification module 352. In an aspect, NFC RF discovery loop modification module 352 may be operable to modify various aspects of a RF discovery loop process. For example, NFC RF discovery loop modification module 352 may modify an interval between which communications device 310 polls/listens, may modify an interval between polling for each NFC RF technology (e.g., NFC-A, NFC, B, and NFC-F), may modify various RF discovery loop parameters based on a determination that a signal strength from a first RAT is above a threshold value, increasing faster than a threshold rate, etc., or any combination thereof. In an optional aspect, RF activity module 350 may include NFC presence parameter module 354 that may be operable to detect the presence of a parameter in a first RAT signal (e.g., Bluetooth LE) that may advertize co-located support for NFC in a remote NFC device 330.

Accordingly, a communications network 300 is described in which a communications device 310 may use RF activity of a first RAT on a NFC enabled device to assist in detecting an increased probability of a second NFC device presence.

Figure 4:
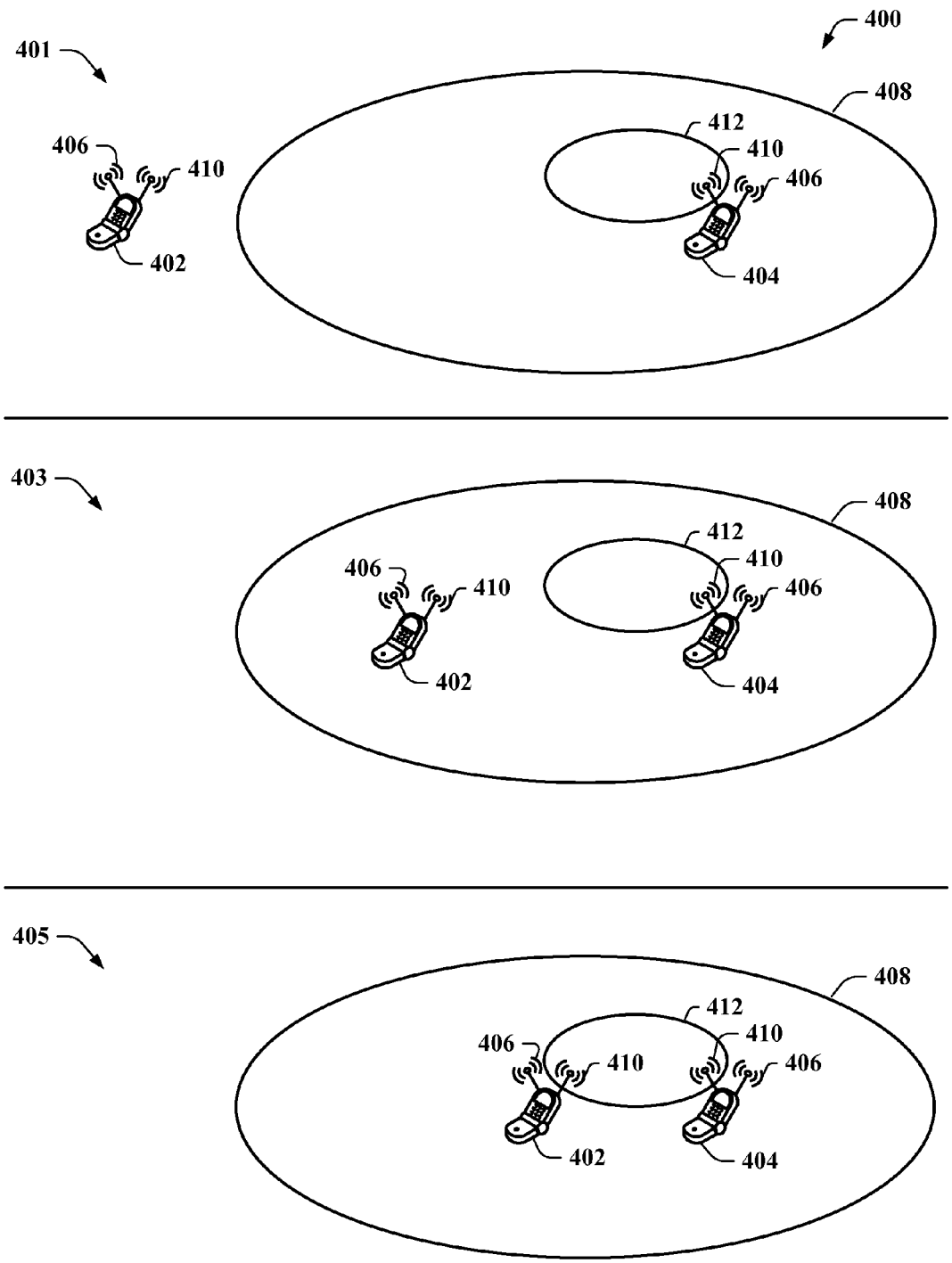
FIG. 4 is a block diagram of a NFC environment NFC devices at various distances from each other, according to an aspect.

FIG. 4 is a block diagram of a NFC communications environment 400 with communications devices (402, 404) at various distances from each other (401, 403, 405), according to an aspect. Each communications device (402, 404) may be operable to use a first RAT 406 that has a first coverage area 408 and a NFC RF technology 410 that has a second coverage area 412. In an aspect, the first RAT may be a RAT supporting a personal area network (PAN) such as, but not limited to, FlashLinQ, WiMedia, Bluetooth, ZigBee, Wi-Fi based on the IEEE 802.11 standard, etc. In an aspect, the remote NFC endpoints 404 may include, but is not limited to, a remote NFC tag, a reader/writer device, a peer initiator device, a remote peer target device, a card emulator, etc.

At distance 401, communications device 402 may be outside the first coverage area 408 of a first RAT 406. In such an aspect, communications device 402 may operate a RF discovery loop associated with NFC communications in a manner that minimizes NFC device power usage.

At distance 403, communications device 402 may be within the first coverage area 408 of the first RAT 406, but not close enough to the remote NFC endpoint 404 to establish a NFC connection using a NFC RF technology 410. At such a distance 403, the communications device 402 may modify an interval between polling modes in a NFC RF discovery loop. In an aspect, the communications device 402 may modify an interval between polling for each NFC RF technology. In an aspect, the NFC device may decrease the interval between polling modes based on the monitored signal strength. In an aspect, the NFC device may decrease the interval between polling modes proportionally with respect to a change in the signal strength value between the first time and the second time. In an aspect, the NFC device may modify the interval between polling modes in a manner to improve power consumption efficiency for the first NFC device.

At distance 405, the communications device 402 may be placed within proximity of remote NFC endpoint 404 such that the communications devices (402, 404) are within the NFC RF technology 410 coverage area 412. In such an aspect, at least in part because of the modified interval between polling modes in a NFC RF discovery loop, the communications devices (402, 404) may detect each other's presence comparatively more quickly than if the NFC RF discovery loop had not been modified.

Accordingly, an example NFC communications environment 400 is disclosed in which a communications device 402 may modify NFC RF discovery loop characteristics to improve connection efficiency with a reduced impact on overall power consumption.

Figure 5:
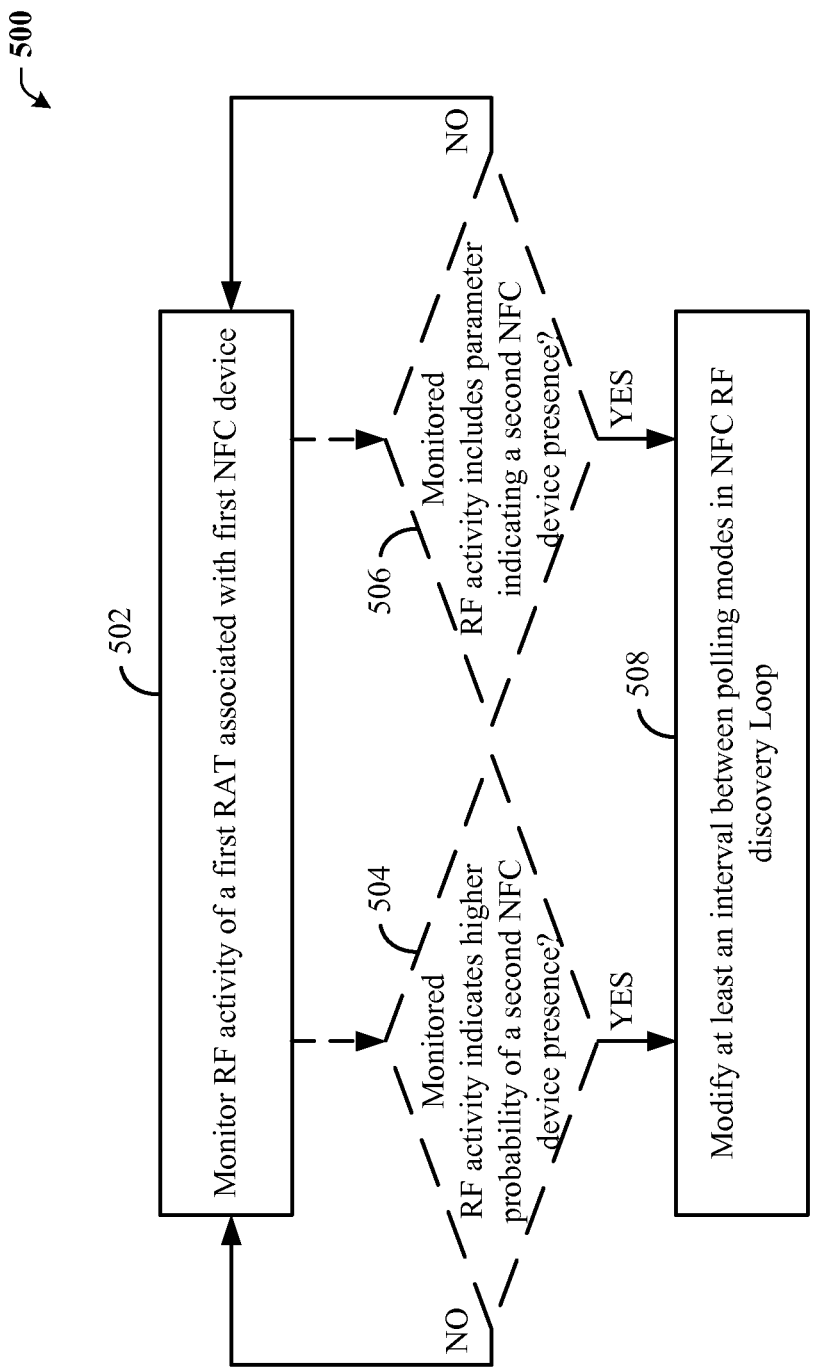
FIG. 5 is a flowchart describing an example of an NFC device to improve NFC RF discovery through monitoring RF activity associated with one or more RATs, according to an aspect.
Figure 6:
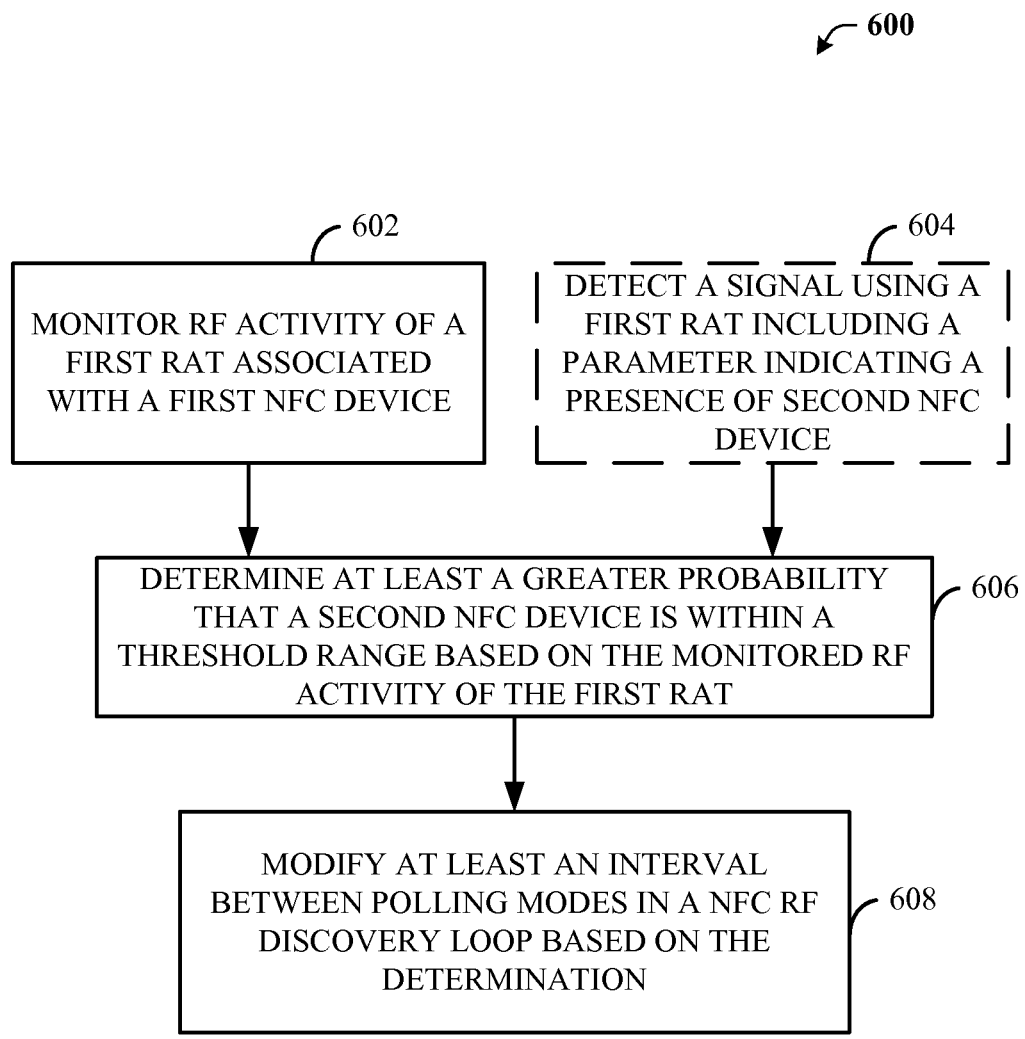
FIG. 6 is a flowchart describing another example of an NFC device to improve NFC RF discovery through monitoring RF activity associated with one or more RATs, according to an aspect.

FIGS. 5 and 6 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 5 illustrates an example flowchart process 500 using RF activity of a first RAT on a NFC enabled device to assist in detecting an increased probability of a second NFC device presence.

At block 502, a NFC device may monitor RF activity of a first RAT associated with the NFC device. A number of shorter-range RATs are widely deployed in handheld devices such as mobile phones, headsets, and laptops. Although shorter range than cellular based RATs, the range may be generally greater than that of NFC. Thus a handheld device monitor RF activity of non-NFC RATs before it would be able to communicate over NFC. In an aspect, the first RAT may be a RAT supporting a personal area network (PAN) and/or local area network (LAN) such as, but not limited to, FlashLinQ, WiMedia, Bluetooth, ZigBee, Wi-Fi based on the IEEE 802.11 standard, etc.

In one optional aspect, at block 504, the NFC device may determine whether the monitored RF activity indicates a higher probability of the second NFC device being present. In an aspect, the higher probability may be indicated by the RF activity increasing above a threshold signal strength. In another aspect, the higher probability may be indicated by a determination that the RF activity is increasing in intensity over time. For example, where a co-located PAN RAT detect an increasing amount of RF activity, such as Bluetooth, ZigBee, etc., the probability rises that the NFC enabled device is approaching another handheld device, and thus that it is approaching another device that may be NFC enabled. In another aspect, for "touch to exchange" items such as but not limited to business cards, the profile of such an approach could be identified by the rate at which the signal strength increases. If at block 504, the NFC device determines that there is not an increased probability of the presence of a second NFC device, then the process may return to block 502.

In another optional aspect, at block 506, the NFC device may determine whether the monitored RF activity includes a signal with a parameter indicating the presence of a second NFC device. As used herein, a parameter may refer to any signal and/or signal content such as, but not limited to, a beacon, a message, a variable, etc. In an aspect, a second NFC device may use the first RAT to advertize co-located support for NFC, another device that detects this information can thus infer that there is an increased probability of the use of NFC, so it can choose to increase the amount of time the NFC component is searching (either by polling, listening, or a combination of both). This operation may be particularly effective if the range of the co-located RAT is longer than NFC, but not by a large amount. If the range is too great, the devices may be nowhere near each other, so increasing NFC activity may result in unnecessary power consumption. One RAT that may provide effective functionality is Bluetooth (e.g., Bluetooth LE). Bluetooth generally may be included in a range of devices such as but not limited to, handsets, laptops, tablets, headsets, etc., may be left in an active state, has a range of approximately 10 meters (which may provide ample time to increase NFC activity), and may define a mechanism by which a NFC enabled device may advertize its capabilities (e.g., Bluetooth LE). If at block 506, the NFC device determines that the RF activity does not include a signal with a parameter indicating the presence of a second NFC device, then the process may return to block 502.

By contrast, if at block 504, the monitored RF activity indicates a higher probability of a second NFC device presence, and/or if at block 506, the monitored RF Activity includes a signal with a parameter indicating the presence of a second NFC device, then at block 508, the NFC device may modify at least an interval between polling modes in a NFC RF discovery loop. For example, where there is an increased probability of the second NFC device being present, the NFC device may increase the amount of time the NFC component is searching (either by polling, listening, or a combination of both). In another aspect, the NFC device may increase occurrence of polling for one or more specific NFC RF technologies. For example, where the second NFC device may be determined to be a peer device, then the first NFC device may poll NFC RF technologies NFC-A and NFC-F comparatively more often than NFC-B.

As such, a process is disclosed in which a NFC device may use RF activity of a first RAT on a NFC enabled device to assist in detecting an increased probability of a second NFC device presence.

FIG. 6 is an example process 600 for using RF activity of a first RAT on a NFC enabled device to assist in detecting an increased probability of a second NFC device presence.

At block 602, a NFC enabled device may monitor RF activity of a first RAT used by a first NFC device. In an aspect, the first RAT may be different than a NFC RF technology used by the first NFC device. In another aspect, the NFC device may monitor for a signal strength value of the first RAT at a first time and a second time after the first time. In an aspect, the NFC device may monitor for a signal strength value of the first RAT. In an aspect, the first RAT may include a RAT supporting a wireless communication system based FlashLinQ, WiMedia, Bluetooth, ZigBee, Wi-Fi based on the IEEE 802.11 standard, etc.

In an optional aspect, at block 604, a NFC device may detect a signal including a parameter indicating a presence of the second NFC device. As used herein, a parameter may refer to any signal and/or signal content such as, but not limited to, a beacon, a message, a variable, etc.

At block 606, the NFC device may determining at least a greater probability that a second NFC device is within a threshold range based on the monitored RF activity of the first RAT. In an aspect, the NFC device may determine that the signal strength value of the first RAT monitored at the second time is greater than the signal strength value of the first RAT monitored at the first time. In an optional aspect associated with optional block 604, the NFC device may determine that the second NFC device is within the threshold range based on the presence of the parameter in the signal. In aspect, the second NFC device may be a peer NFC device, a reader device, a writer device, a tag, a card, etc.

At block 608, the NFC device may modify at least an interval between polling modes in a NFC RF discovery loop based on the determination. In an aspect, the NFC device may modify an occurrence of polling for each NFC RF technology. In an aspect, the NFC device may decrease the interval between polling modes based on the monitored signal strength. In an aspect, the NFC device may decrease the interval between polling modes proportionally with respect to a change in the signal strength value between the first time and the second time. In an aspect, the NFC device may modify the interval between polling modes in a manner to improve power consumption efficiency for the first NFC device.

Figure 7:
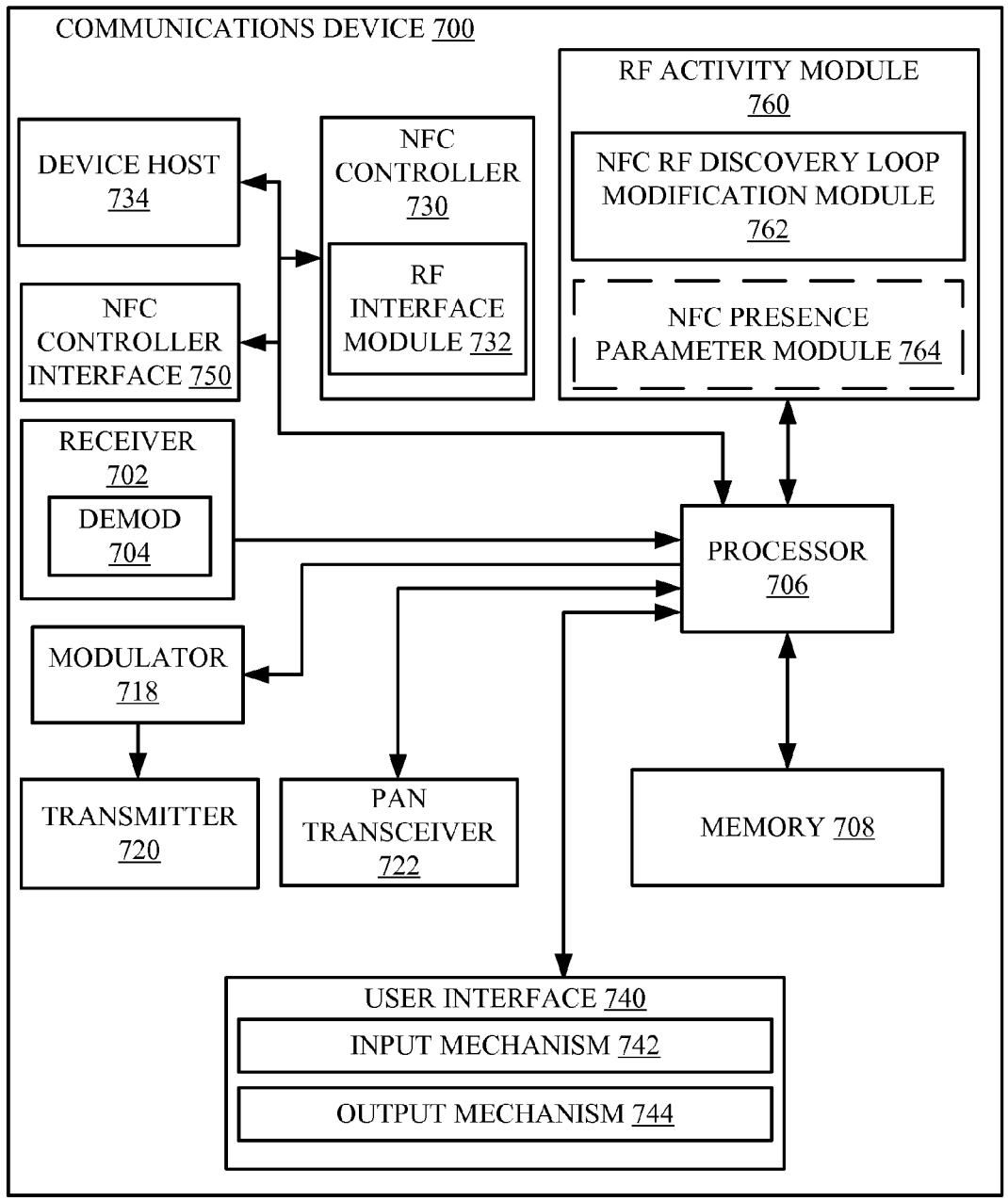
FIG. 7 is a functional block diagram of an example architecture of a communications device, according to an aspect.

While referencing FIG. 3, but turning also now to FIG. 7, an example architecture of communications device 700 is illustrated. As depicted in FIG. 7, communications device 700 comprises receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to processor 706 for channel estimation. Processor 706 can be a processor dedicated to analyzing information received by receiver 702 and/or generating information for transmission by transmitter 720, a processor that controls one or more components of device 700, and/or a processor that both analyzes information received by receiver 702, generates information for transmission by transmitter 720, and controls one or more components of communications device 700. Further, signals may be prepared for transmission by transmitter 720 through modulator 718 which may modulate the signals processed by processor 706. In an aspect, communications device 700 may include a transceiver 722, such as but not limited to a PAN transceiver 722 that may be operable to monitor RF activity from one or more remote NFC devices. In an optional aspect, PAN transceiver 722 may be operable to receive and decode a parameter advertizing co-located NFC capabilities that is communicated by a remote NFC device.

Communications device 700 can additionally comprise memory 708 that is operatively coupled to various components, such as but not limited processor 706 and that can store data to be transmitted, received data, information related to available channels, TCP flows, data associated with analyzed signal and/or interference strength, information related to an assigned channel, power, rate, or the like, and any other suitable information for assisting in NFC connection establishment.

Further, processor 706, and/or RF activity module 760 can provide means for monitoring RF activity of a first RAT used by a communications device 700, means for determining at least a greater probability that a second NFC device is within a threshold range based on the monitored RF activity of the first RAT, and means for modifying at least an interval between polling modes in a NFC RF discovery loop based on the determination. In an aspect, the first RAT may be different than a NFC RF technology used by the communications device 700.

It will be appreciated that data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 708 of the subject systems and methods may comprise, without being limited to, these and any other suitable types of memory.

Communications device 700 may include a NFC controller 730. In an aspect, NFCC 730 may include RF interface module 732. RF interface module 732 may be operable to enable NFC communications.

In another aspect, communications device 700 may include NCI 750. In an aspect, NCI 750 may be operable to enable communications between NFC controller 730 and device host 734. NCI 750 may be operable to function in a listening mode and/or a polling mode.

In another aspect, communications device 700 may include RF activity module 760. RF activity module 760 may include NFC RF discovery loop modification module 762. In an aspect, NFC RF discovery loop modification module 762 may be operable to modify various aspects of a RF discovery loop process based on any of the previously described mechanisms for using the first RAT. In an optional aspect, RF activity module 760 may include NFC presence parameter module 764 that may be operable to detect the presence of a parameter in a first RAT signal (e.g., Bluetooth LE) that may advertize co-located support for NFC in a remote NFC device. In another aspect, RF activity module 760 may be operable to perform processes described with respect to FIGS. 5 and 6.

Additionally, communications device 700 may include user interface 740. User interface 740 may include one or more input mechanisms 742 for generating inputs into communications device 700, and output mechanism 744 for generating information for consumption by the user of the communications device 700. For example, input mechanisms 742 may include a mechanism such as a key or keyboard, a mouse, a touch-screen display, a microphone, etc. Further, for example, output mechanism 744 may include a display, an audio speaker, a haptic feedback mechanism, etc. In the illustrated aspects, the output mechanism 744 may include a display operable to present media content that is in image or video format or an audio speaker to present media content that is in an audio format.

Figure 8:
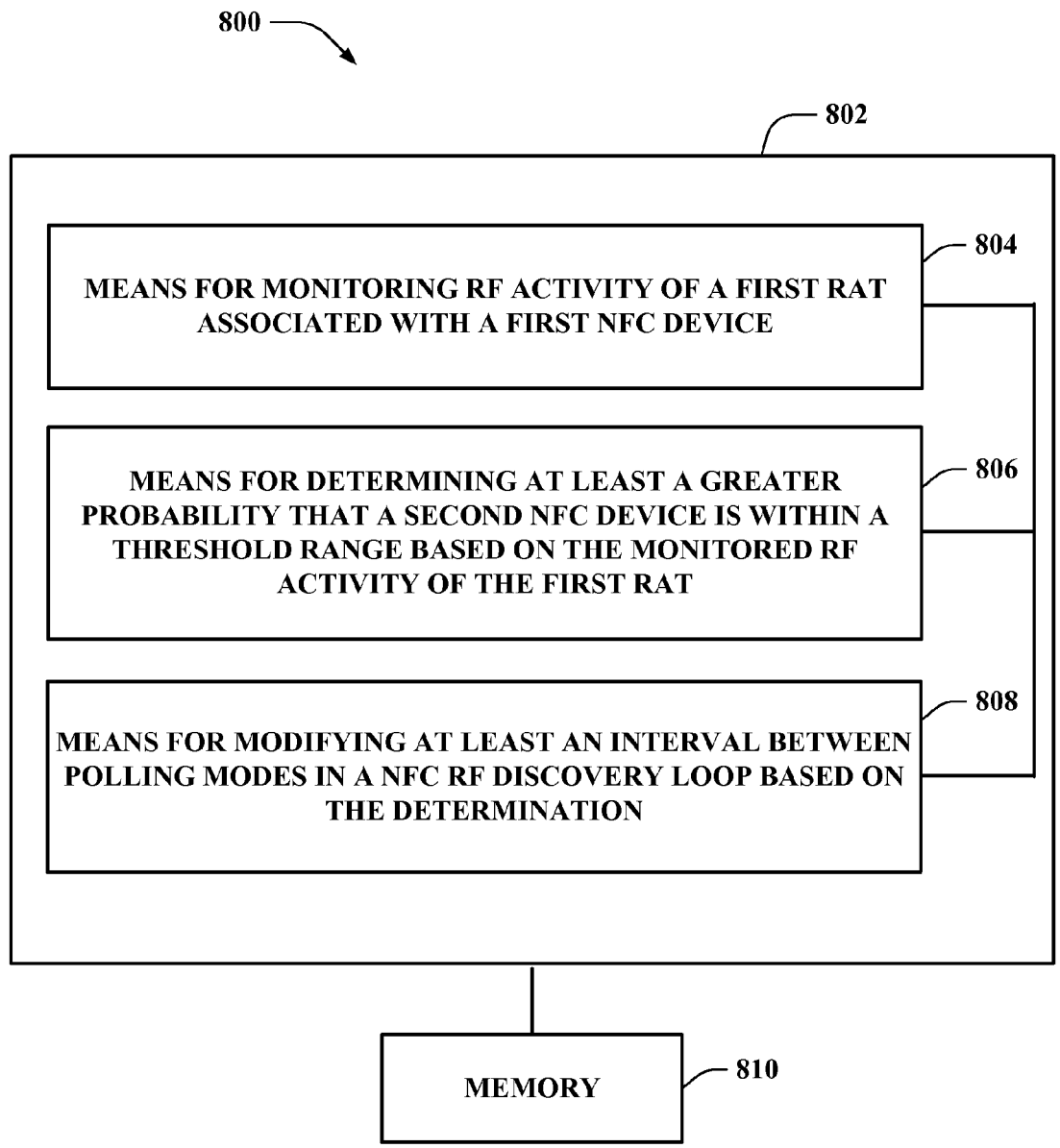
FIG. 8 is a block diagram of an example communication system for improving NFC RF discovery through monitoring RF activity associated with one or more RATs, according to an aspect.

FIG. 8 depicts another depicts a block diagram of an exemplary communication system 800 operable to improve NFC RF discovery through monitoring RF activity associated with one or more RATs, according to an aspect. For example, system 800 can reside at least partially within a communications device (e.g., communications device 700). It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction.

For instance, logical grouping 802 can include an electrical component that may provide means for monitoring RF activity of a first RAT used by a first NFC device 804. In an aspect, the first RAT may be different than a NFC RF technology used by the first NFC device. In another aspect, the means for monitoring 804 may further include means for monitoring a signal strength value of the first RAT at a first time and a second time after the first time. In still another aspect, the means for monitoring 804 may include means for detecting a signal including a parameter indicating a presence of the second NFC device. In such an aspect, the parameter may advertise that the second device may include co-located NFC capabilities. In an aspect, the means for monitoring 804 may further include means for monitoring a signal strength value of the first RAT. In an aspect, the first RAT may include a RAT supporting a wireless communication system based FlashLinQ, WiMedia, Bluetooth, ZigBee, Wi-Fi based on the IEEE 802.11 standard, etc.

Further, logical grouping 802 can include an electrical component that may provide means for determining at least a greater probability that a second NFC device is within a threshold range based on the monitored RF activity of the first RAT 806. In an aspect, the means for determining 806 may include means for determining that the signal strength value of the first RAT monitored at the second time is greater than the signal strength value of the first RAT monitored at the first time. In another aspect, the means for determining 806 may include means for determining that the second NFC device is within the threshold range based on the presence of the parameter in the signal. In such an aspect, the parameter may include configuration information associated with connecting with a co-located NFC module. In aspect, the second NFC device may be a peer NFC device, a reader device, a writer device, a tag, a card, etc.

Moreover, logical grouping 802 can include an electrical component that may provide means for modifying at least an interval between polling modes in a NFC RF discovery loop based on the determination 808. In an aspect, the means for modifying 808 may include means for modifying occurrence of polling for each NFC RF technology. In an aspect, the means for modifying 808 may include means for decreasing the interval between polling modes based on the monitored signal strength. In an aspect, the means for modifying 808 may include means for decreasing the interval between polling modes proportionally with respect to a change in the signal strength value between the first time and the second time. In an aspect, the means for modifying 808 may include means for modifying the interval between polling modes in a manner to improve power consumption efficiency for the first NFC device.

Additionally, system 800 can include a memory 810 that retains instructions for executing functions associated with the electrical components 804, 806, and 808, stores data used or obtained by the electrical components 804, 806, 808, etc. While shown as being external to memory 810, it is to be understood that one or more of the electrical components 804, 806, and 808 may exist within memory 810. In one example, electrical components 804, 806, and 808 can include at least one processor, or each electrical component 804, 806, and 808 can be a corresponding module of at least one processor. Moreover, in an additional or alternative example, electrical components 804, 806, and 808 may be a computer program product including a computer readable medium, where each electrical component 804, 806, and 808 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations.

That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of communications, comprising:
    monitoring a signal strength value of a first radio access technology (RAT) used by a first near field communication (NFC) device, wherein the first RAT is different than a NFC radio frequency (RF) technology used by the first NFC device;
    determining an increase the monitored signal strength value of the first RAT by the NFC device;
    determining that a probability that a second NFC device is within a threshold distance of the first NFC device has increased based at least on the monitored signal strength value of the first RAT and the increase in the monitored signal strength value of the first RAT, wherein the threshold distance is based on a coverage area of the NFC RF technology used by the first NFC device; and
    modifying at least an interval between polling modes in a NFC RF discovery loop based on the determination that the probability that the second NFC device is within the threshold distance of the first NFC device has increased.

2. The method of claim 1, wherein the monitoring further comprises:
    monitoring the signal strength value of the first RAT at a first time and a second time after the first time; and
    determining the increase in the monitored signal strength value based on the signal strength value of the first RAT at the first time and the second time.

3. The method of claim 2, wherein the determining that the probability that the second NFC device is within the threshold distance of the first NFC device has increased further comprises determining that the signal strength value of the first RAT monitored at the second time is above a power threshold.

4. The method of claim 1, further comprising determining that the monitored signal strength value is increasing at a rate that is greater than a threshold rate, and wherein the determining that the probability that the second NFC device is within the threshold distance of the first NFC device has increased is further based on the determination that the monitored signal strength value is increasing at the rate that is greater than the threshold rate.

5. The method of claim 1, wherein the modifying further comprises modifying occurrence of polling for each NFC RF technology.

6. The method of claim 1,
    wherein the modifying further comprises decreasing the interval between polling modes based on the monitored signal strength value.

7. The method of claim 6, further comprising:
    determining a change in the monitored signal strength value; and
    wherein the modifying further comprises decreasing the interval between polling modes proportionally with respect to the determined change.

8. The method of claim 1, wherein the modifying further comprises modifying the interval between polling modes in a manner to improve power consumption efficiency for the first NFC device.

9. The method of claim 1, wherein the first RAT includes a RAT supporting a wireless communication system based on one of a group consisting of: FlashLinQ, WiMedia, Bluetooth, ZigBee, and Wi-Fi based on the IEEE 802.11 standard.

10. The method of claim 1, wherein the second NFC device is one of a group consisting of: a peer NFC device, a reader device, a writer device, a tag, and a card.

11. The method of claim 1, wherein the first RAT supports at least one of a personal area network (PAN) and a local area network (LAN).

12. A non-transitory computer-readable medium comprising code for:
> monitoring a signal strength value of a first radio access technology (RAT) used by a first near field communication (NFC) device, wherein the first RAT is different than a NFC radio frequency (RF) technology used by the first NFC device;
> determining an increase in the monitored signal strength value of the first RAT by the NFC device;
> determining that a probability that a second NFC device is within a threshold distance of the first NFC device has increased based at least on the monitored signal strength value of the first RAT and the increase in the monitored signal strength value of the first RAT, wherein the threshold distance is based on a coverage area of the NFC RF technology used by the first NFC device; and
> modifying at least an interval between polling modes in a NFC RF discovery loop based on the determination that the probability that the second NFC device is within the threshold distance of the first NFC device has increased.

13. The non-transitory computer-readable medium of claim 12, further comprising code for:
> monitoring the signal strength value of the first RAT at a first time and a second time after the first time; and
> determining the increase in the monitored signal strength value based on the signal strength value of the first RAT at the first time and the second time.

14. The non-transitory computer-readable medium of claim 13, the determining that the probability that the second NFC device is within the threshold distance of the first NFC device has increased further comprises determining that the signal strength value of the first RAT monitored at the second time is above a power threshold.

15. The non-transitory computer-readable medium of claim 12, further comprising code for:
> determining that the monitored signal strength value is increasing at a rate that is greater than a threshold rate, and wherein the determining that the probability that the second NFC device is within the threshold distance of the first NFC device has increased is further based on the determination that the monitored signal strength value is increasing at the rate that is greater than the threshold rate.

16. The non-transitory computer-readable medium claim 12, further comprising code for modifying occurrence of polling for each NFC RF technology.

17. The non-transitory computer-readable medium of claim 12, wherein the non-transitory computer-readable medium further comprises code for:
> decreasing the interval between polling modes based on the monitored signal strength value.

18. The non-transitory computer-readable medium of claim 17, further comprising code for:
> determining a change in the monitored signal strength value; and
> decreasing the interval between polling modes proportionally with respect to the determined change.

19. The non-transitory computer-readable medium of claim 12, further comprising code for modifying the interval between polling modes in a manner to improve power consumption efficiency for the first NFC device.

20. The non-transitory computer-readable medium of claim 12, wherein the first RAT includes a RAT supporting a wireless communication system based on one of a group consisting of: FlashLinQ, WiMedia, Bluetooth, ZigBee, and Wi-Fi based on the IEEE 802.11 standard.

21. The non-transitory computer-readable medium of claim 12, wherein the second NFC device is one of a group consisting of: a peer NFC device, a reader device, a writer device, a tag, and a card.

22. An apparatus for communications, comprising:
> means for monitoring a signal strength value of a first radio access technology (RAT) used by a first near field communication (NFC) device, wherein the first RAT is different than a NFC radio frequency (RF) technology used by the first NFC device;
> means for determining an increase in the monitored signal strength value of the first RAT by the NFC device;
> means for determining that a probability that a second NFC device is within a threshold distance of the first NFC device has increased based at least on the monitored signal strength value of the first RAT and the increase in of the monitored signal strength value of the first RAT, wherein the threshold distance is based on a coverage area of the NFC RF technology used by the first NFC device; and
> means for modifying at least an interval between polling modes in a NFC RF discovery loop based on the determination that the probability that the second NFC device is within the threshold distance of the first NFC device has increased.

23. The apparatus of claim 22, wherein the means for monitoring further comprises means for monitoring the signal strength value of the first RAT at a first time and a second time after the first time; and
> wherein the means for determining the increase in the monitored signal strength value comprises means for determining the increase in the monitored signal strength value based on the signal strength value of the first RAT at the first time and the second time.

24. The apparatus of claim 23, wherein the means for determining that the probability that the second NFC device is within the threshold distance has increased further comprises means for determining that the signal strength value of the first RAT monitored at the second time is above a power threshold.

25. The apparatus of claim 22, further comprising means for determining that the monitored signal strength value is increasing at a rate that is greater than a threshold rate, and wherein the means for determining that the probability that the second NFC device is within the threshold distance of the first NFC device has increased further comprises means for determining that the probability that the second NFC device is within the threshold distance of the first NFC device has increased based on the determination that the monitored signal strength value is increasing at the rate that is greater than the threshold rate.

26. The apparatus of claim 22, wherein the means for modifying further comprises means for modifying occurrence of polling for each NFC RF technology.

27. The apparatus of claim 22,
> wherein the means for modifying further comprises means for decreasing the interval between polling modes based on the monitored signal strength value.

28. The apparatus of claim 27, further comprising:
> means for determining a change in the monitored signal strength value; and
> wherein the means for modifying further comprises means for decreasing the interval between polling modes proportionally with respect to the determined change.

29. The apparatus of claim 22, wherein the means for modifying further comprises means for modifying the interval between polling modes in a manner to improve power consumption efficiency for the first NFC device.

30. The apparatus of claim 22, wherein the first RAT includes a RAT supporting a wireless communication system based on one of a group consisting of: FlashLinQ, WiMedia, Bluetooth, ZigBee, and Wi-Fi based on the IEEE 802.11 standard.

31. The apparatus of claim 22, wherein the second NFC device is one of a group consisting of: a peer NFC device, a reader device, a writer device, a tag, and a card.

32. An NFC device for communications, comprising:
a memory;
a processor coupled to the memory; and
a radio frequency (RF) activity module coupled to at least one of the memory or the processor, and configured to:
monitor a signal strength value of a first radio access technology (RAT) used by a first near field communication (NFC) device, wherein the first RAT is different than a NFC RF technology used by the first NFC device;
determine an increase in the monitored signal strength value of the first RAT by the NFC device;
determine that a probability that a second NFC device is within a threshold distance of the first NFC device has increased based at least on the monitored signal strength value of the first RAT and the increase in the monitored signal strength value of the first RAT, wherein the threshold distance is based on a coverage area of the NFC RF technology used by the first NFC device; and
modify at least an interval between polling modes in a NFC RF discovery loop based on the determination that the probability that the second NFC device is within the threshold distance of the first NFC device has increased.

33. The NFC device of claim 32, wherein the RF activity module is further configured to:
monitor the signal strength value of the first RAT at a first time and a second time after the first time; and
wherein the RF activity module configured to determine the increase in the monitored signal strength value further comprises the RF activity module configured to determine the increase in the monitored signal strength value based on the signal strength value of the first RAT at the first time and the second time.

34. The NFC device of claim 33, wherein the RF activity module configured to determine that the probability that the second NFC device is within the threshold distance of the first NFC device has increased further comprises the RF activity module configured to determine that the signal strength value of the first RAT monitored at the second time is above a power threshold.

35. The NFC device of claim 32, wherein the RF activity module is further configured to:
determine that the monitored signal strength value is increasing at a rate that is greater than a threshold rate, and determine that the probability that the second NFC device is within the threshold distance of the first NFC device has increased further based on the determination that the monitored signal strength value is increasing at the rate that is greater than the threshold rate.

36. The NFC device of claim 32, wherein the RF activity module is further configured to modify occurrence of polling for each NFC RF technology.

37. The NFC device of claim 32, wherein the RF activity module is further configured to:
decrease the interval between polling modes based on the monitored signal strength value.

38. The NFC device of claim 37, wherein the RF activity module is further configured to:
determine a change in the monitored signal strength value; and
decrease the interval between polling modes proportionally with respect to the determined change.

39. The NFC device of claim 32, wherein the RF activity module is further configured to modify the interval between polling modes in a manner to improve power consumption efficiency for the first NFC device.

40. The NFC device of claim 32, wherein the first RAT includes a RAT supporting a wireless communication system based on one of a group consisting of: FlashLinQ, WiMedia, Bluetooth, ZigBee, and Wi-Fi based on the IEEE 802.11 standard.

41. The NFC device of claim 32, wherein the second NFC device is one of a group consisting of: a peer NFC device, a reader device, a writer device, a tag, and a card.

* * * * *